Nov. 18, 1958     A. J. PARK     2,861,120

JUNCTION BOX ASSEMBLY

Filed Oct. 24, 1955

INVENTOR.
ALLAN J. PARK
BY Woodling & Kroot
Atty's.

United States Patent Office 2,861,120
Patented Nov. 18, 1958

2,861,120

JUNCTION BOX ASSEMBLY

Allan J. Park, Cleveland, Ohio, assignor to The National Acme Company

Application October 24, 1955, Serial No. 542,170

4 Claims. (Cl. 174—59)

The invention relates in general to junction box assemblies and more particularly to junction box assemblies having a base member and a case member which are arcuately and laterally movable relative to each other.

Electrical junction boxes made of metal or other fire resistant material are commonly used at places where electrical conductors are to be joined in order to provide fire protection. A typical junction box is one which has side walls provided with "knock outs" which are generally circular openings almost completely pushed through the metal and which may be readily removed so that a conduit, fitting or cable fitting may be fastened to the junction box. The electrical connection or splice takes place within the junction boxes. The plurality of "knock outs" in these prior art devices make certain that one may bring the electrical conductors to the box in either vertical or horizontal directions, assuming that the box is mounted on a vertical surface.

The present invention relates particularly to junction boxes adapted to be used with machinery such as machine tools which utilizes electric power. The machine is completely wired internally when shipped from the factory and only external conductors extend from the machine when it is received at the installation site. One pair of wires may be brought to the junction box in metallic conduit ready for connection to the external conductors. Accordingly it is a principal object of the invention to provide a junction box assembly having a case which may be rotated to any desired angular position relative to a base and which may also be shifted sideways with respect to the base to give a workman more room to splice the wires and the external conductors together. This permits electrical connection to the junction box assembly by bringing the conduit to the case in any selected angular direction and thus facilitates ease and quickness of electrical connection.

An object of the invention is to provide a junction box assembly which has a case member for containing the joined ends of electrical conductors, which may be moved arcuately with respect to a base member to which it is connected.

Another object of the invention is to provide a junction box assembly which includes a base member having a case retainer attached thereto to form a guideway and a case member having a lip which lip resides within the guideway whereby the base member and case member are rotatably attached to each other.

Still another object of the invention is to provide a junction box assembly which includes a base member having a mounting plate and a case retainer attached thereto to form a guideway which guideway serves to guide and hold the lip of a case member which lip has a greater dimension than the minimum dimension of the guideway and screw means for clamping the case retainer with respect to the mounting plate thereby regulating the size of the guideway whereby the case member may be either fixedly held or rotatively and laterally moved with respect to the base member.

Another object of the invention is to provide an opening in a terminal block to receive a retaining stud extending centrally through the case member of a junction box assembly whereby the terminal block is retained from lateral movement within, yet is easily and quickly removed from the case member.

Other objects and a fuller understanding of this invention may be had by referring to the following description and claims, taken in conjunction with the accompanying drawing, in which:

Figure 1:
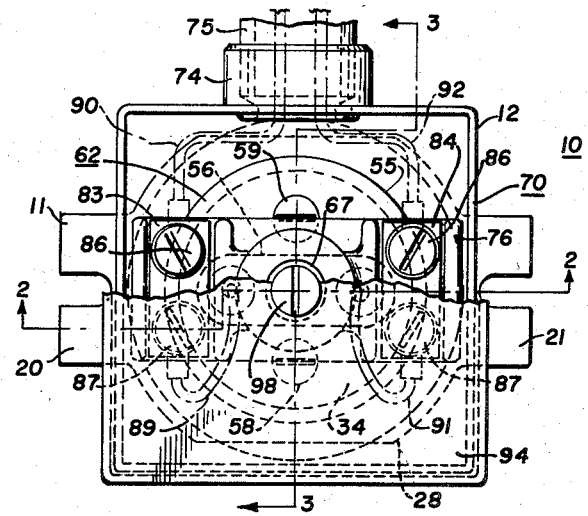
Figure 1 is a plan view of a junction box assembly embodying this invention with a portion broken away to show the interior construction.
Figure 2:
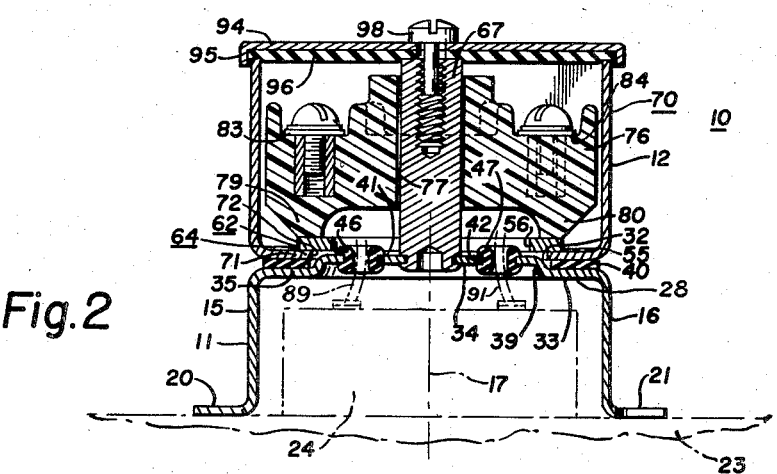
Figure 2 is a side elevational view of the junction box assembly taken generally along the line 2—2 of Figure 1.
Figure 3:
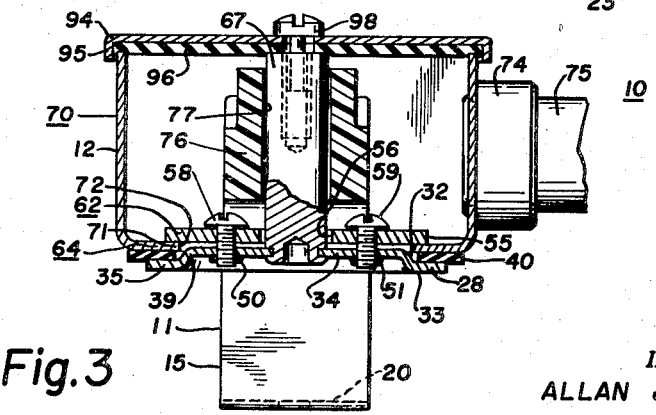
Figure 3 is a view taken along the line 3—3 of Figure 1.

The junction box assembly 10 of this invention comprises generally a U-shaped base member 11 and a case member 12. The base member 11 has first and second legs 15 and 16, respectively, and an axis of symmetry indicated by the dot-dash line 17. The first and second legs 15 and 16 are provided with outturned mounting ears 20 and 21 thereon. As shown in Figure 2 the U-shaped base member 11 is connected to a supporting structure 23 and straddles and partially encloses an electric device 24 which might include a switch or solenoid or other similar electrical device. A generally square shaped mounting plate 28 is formed integrally with the first and second legs 15 and 16 and extends in a plane which is generally normal to the axis 17. The first and second legs extend at generally right angles to the mounting plate. The mounting plate 28 has first and second sides 32 and 33 and includes a raised circular portion 34 coaxial with the base member 11. The mounting plate also includes an outer portion 35 which extends around and generally surrounds the raised circular portion. The raised circular portion 34 and the outer portion 35 are connected by a circular or annular shoulder 39. A gasket member 40 resides on the first side 32 of the outer portion 35. A first and a second aperture 41 and 42, respectively, extend through the raised circular portion 34 from the first side 32 to the second side 33 thereof. A first and a second rubber grommet 46 and 47 resides within the first and second aperture 41 and 42, respectively. These grommets provide for electrical insulation and physical protection to electrical conductors which are to extend therethrough. A first and a second supporting disc 50 and 51 are fixedly secured to the second side 33 of the raised circular portion 34 by silver soldering or other suitable means. A circular case retainer 55 having a slot 56 in the central portion thereof is located on the first side 32 of the mounting plate 28 with the slot in registry with the first and second apertures 41 and 42. The case retainer 55 is fixedly attached to the first side 32 of the raised circular portion 34 by first and second screw means 58 and 59, respectively, which screw means include first and second cap screws extending through the case retainer and into the first and second supporting discs 50 and 51, respectively. The supporting discs 50 and 51 provide sufficient metal whereby a minimum number of threads per inch can be provided so that the first and second screw means may be suitably anchored. The case retainer 55 has an outer peripheral edge portion 62 axially spaced from the outer portion 35 of the mounting plate 28 a first distance. The outer peripheral edge portion 62 of the case retainer and the gasket member 40 form a circular or an annular guideway therebetween. This guideway is indicated generally by the reference numeral 64. In the event the gasket member 40 was absent the guideway could be referred to as being formed between the outer peripheral edge portion 62 and the outer portion 35 of the mounting plate 28. A retaining stud 67 is fixedly attached to the raised circular portion 34 and extends coaxially from the first side 32 thereof.

The case member 12 has axially extending side walls 70 which terminate at a lower end thereof in a lip 71 which lip extends inwardly toward the retaining stud 67 in a direction which is substantially perpendicular to the axis 17. The lip 71 terminates in a lip wall 72 which is annular or circular in configuration. The circular lip wall 72 is of a greater diameter than the circular shoulder 39. When the case member and the base member of the junction box assembly are in the assembled position, as shown in the accompanying drawing, the lip wall 72 surrounds the circular shoulder 39. A hub 74 is attached to one of the side walls 70 for receiving and connecting electrical conduit 75 thereto. It will be readily recognized that the hub might be mounted on the case member 12 entirely within the side walls 70 or even might be replaced by many suitable means for gaining entrance to the case member such as by knock-outs provided in the sidewalls 70 of the case member 12. A terminal block 76 having an opening 77 extending axially therethrough resides within the case member 12 with the retaining stud 67 extending through the opening 77. With this type of construction the retaining stud 67 maintains the terminal block 76 centrally located within the case member 12. This type of construction also provides for the easy removal of the terminal block from the case member. The terminal block 76 has first and second legs 79 and 80 which reside respectively on the case retainer 55 for supporting the terminal block within the case member. The terminal block is preferably constructed of a plastic material to provide good electric insulation from the rest of the junction box assembly. The terminal block is provided with a first and a second terminal plate 83 and 84 each of which are secured to the terminal block by first and second terminal plate screws 86 and 87. The first terminal plate 83 provides electrical connection between a first electric conductor 89 which extends from the electrical device 24 into the case member through the first aperture 41 and a second electrical conductor 90 which enters the case member through the conduit 75 and the hub 74. The second terminal plate 84 provides electrical connection between a third electrical conductor 91 which extends from the electrical device 24 into the case member through the second aperture 42 and a fourth electrical conductor 92 which extends into the case member through the conduit 75 and the hub 74. A cover member 94 resides over and covers the case member 12. The cover member 94 is provided with a peripheral flange 95 which turns down over the side walls 70 at their upper extremities to make a tight fit and insure that the cover member does not turn relative to the case member. A rubber sealing member 96 is suitably bonded to the inner side of the cover member 94 to aid in insuring a good seal between the cover member and the case member. Third screw means 98 extends through the cover member 94 and into the retaining stud 67 for securing the cover member 94 relative to the case member 12.

When the base member 11 and the case member 12 are in the assembled position as shown in all of the drawings, the lip 71 of the case member 12 resides within the circular guideway 64, whereby the case member 12 is attached to the base member 11. The first and second screw means 58 and 59 regulate the physical size or thickness of the guideway 64 and hence while they are in a loosened condition the case member may be moved angularly about the axis 17 with respect to the base member 11. This allows a great deal of freedom to a workman in his choice of directions in attaching conduit to the hub 74. When the screw means are in this condition the case member may also be moved slightly laterally with respect to the axis 17 to provide for slight lateral adjustments of the case member. The first distance between the case retainer 55 and the outer portion 35 of the mounting plate 28 is substantially equal to the combined thickness of the gasket member 40 and the lip 71. After the case member has been turned and located at its desired angular position the first and second screw means 58 and 59 are tightened thereby decreasing the physical size of the guideway 64 and hence clamping the lip 71 between the gasket member 40 or the outer portion 35 and the peripheral edge 62 of the case retainer 55. The gasket member 40 also helps to insure a good seal between the inner confines of the case member and the surrounding atmosphere.

It will therefore be obvious that a junction box assembly which is simple in construction and easy to assemble has been provided. The junction box assembly which has been herein shown and described may therefore be attached to a piece of machinery without regard to the direction which electrical conduit will have to extend to be connected to the junction box. Once the machine has reached its desired destination and electric conduit is run to the junction box assembly, the case member of the junction box assembly may be turned to receive the electrical conduit no matter what direction the conduit approaches the junction box assembly. The invention has also disclosed a unique method of forming a lip and guideway attachment between the base member and the case member of a junction box assembly wherein the physical size of the guideway may be adjusted to either allow or prevent relative angular movement between the case member and base member.

The terminal block 76 may or may not be used inside the case member 12 and as this terminal block is not used then the conductors 89 and 91 may be spliced or otherwise directly connected to the conductors 90 and 92 respectively.

It will thus be seen that the construction shows a case 12 which may be rotated to any desired angular direction relative to the base 11. When the base 11 is attached to a supporting structure 23 which is a machine already wired then the junction box assembly 10 has special advantages. The machine 23 may have electrical control equipment such as solenoids, switches, relays and the like, illustrated disconnected by the electrical device 24 and such electrical devices may have leads 89 and 91 already attached to which electrical connection is to be made. The base 11 partially encloses the electrical device 24 to give physical protection and also provides directly adjacent thereto the case 12. Because this case 12 may be rotated to any desired angular direction then conduit 75 may approach the junction box assembly in any angular direction and yet electrical connection may be made even though only a single hub 74 is provided. This single hub 74 makes certain that there are no extra openings or slits such as caused by knock-out punchings, and this prevents entrance of dirt and moisture which is especially desirable under corrosive or explosive atmospheres or under oily conditions such as which conventionally surrounds machinery.

It will be noted that the lip 71 forms a tongue within the groove established by the annular guideway 74. This tongue and groove assembly provides positive interconnection of the case 12 and base 11 in an axial direction and permits rotative relative movements.

The entire junction box assembly may be readily assembled on the machine or supporting structure 23. First the base member 11 is fastened to the supporting structure 23 at the mounting ears 20 and 21. This may conveniently bridge the electrical device 24 as desired or it may cover an opening in the supporting structure 23 through which the electrical conductors 89 and 91 extend. Next the gasket member 40 is placed on the first side of the outer portion 35 and then the case member 12 is placed on the gasket member 40. With the cover 94 removed, the case retainer 55 may be slipped over the retainer stud 67 and the screws 58 and 59 may then be inserted to hold the entire assembly together. The conductors 89 and 91 may be brought through the grommets 46 and 47 and when the terminal block 76 is inserted over the retainer stud 67, these conductors may be attached to the terminal plates 83 and 84. The cover 94 may then be attached by the screws 98 to thus complete the junction box assembly on the machine 23 ready for shipment to the site of installation of the machine whereat the conduit 75 may be attached at any desired direction.

Because the lip wall 72 is of a greater circumference than the annular shoulder 39 a lateral movement of the case member 12 may be effected before the cover member 94 is attached and the first and second screw means 58 and 59 are secured. This permits the workman to avail himself of slightly more room to work in on one side or the other of the case member 12 while splicing the electrical conductors together.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A junction box assembly comprising in combination a base member having first and second legs and an axis and a case member having axially extending sidewalls, each said first and second legs having a mounting means thereon, a mounting plate integral with said base member and extending generally transverse to said axis, said mounting plate having first and second sides, said mounting plate including a raised central portion with an outer portion of said mounting plate extending around said raised central portion, said raised central portion and said outer portion of said base member connected by an annular shoulder, first and second apertures extending through said raised central portion from said first to said second side thereof, an annular case retainer having a slot in the central portion thereof and located on said first side of said mounting plate with said slot in register with said first and second apertures, said case retainer fixedly attached to said first side of said raised central portion by first and second screw means secured to said raised central portion, said case retainer having an outer peripheral edge portion axially spaced from said outer portion of said mounting plate a first distance, said outer peripheral edge portion of said case retainer and said outer portion of said mounting plate forming an annular guideway therebetween, a gasket member residing in said guideway, a retainer stud fixedly attached to said raised central portion and extending from said first side thereof, said case member having a lip integral therewith which lip extends inwardly toward said retainer stud in a direction substantially transverse to said axis, said lip terminating in a lip wall which is annular in configuration, said annular lip wall being of a greater diameter than said annular shoulder, a hub attached to one of said sidewalls of said case member for receiving and connecting electrical conduit thereto, a terminal block having an opening extending axially therethrough and residing within said case member with said retainer stud slidably extending through said opening in said terminal block, said terminal block having means for electrically connecting conductors which enter said case through said apertures and said hub, respectively, a cover member residing over and covering said case member, screw means extending through said cover member and into said retainer stud for securing said cover member relative to said case member, said lip residing within said annular guideway whereby said case and base members are attached to each other and may be moved angularly about said axis relative to each other and may also be moved laterally with respect to each other before said cover member is secured, said first distance between said outer peripheral edge portion of said case retainer and said outer portion of said mounting plate being substantially equal to the combined thickness of said gasket member and said lip, said first and second screw means comprising means for decreasing and increasing the physical size of said guideway whereby said case and base members may be alternatively fixed and moved relative to each other.

2. A junction box assembly comprising in combination a base member having means for mounting the same upon a supporting structure and a case member having wall means defining an enclosure, said base member including a mounting plate, said mounting plate having first and second sides, said mounting plate including a raised central portion with an outer portion of said mounting plate extending around said raised central portion, said raised central portion and said outer portion of said base member meeting to form an annular shoulder, aperture means extending through said raised central portion from said first to said second side thereof, an annular case retainer having slot means in the central portion thereof and located on said first side of said mounting plate with said slot in register with said aperture means, means fixedly securing said case retainer to said first side of said mounting plate, said case retainer having an outer peripheral edge portion spaced from said outer portion of said mounting plate, said outer peripheral edge portion of said case retainer and said outer portion of said mounting plate forming an annular guideway therebetween, a retainer stud attached to said raised central portion and extending from said first side thereof, said case member having a lip extending inwardly toward said retainer stud, said lip terminating in a lip wall which is annular in configuration, said annular lip wall being larger than said annular shoulder, conduit means for introducing electrical conductors into said case member, a terminal block having an opening extending therethrough and residing within said case member with said retainer stud extending through said opening in said terminal block, said terminal block having means for electrically connecting conductors which enter said case through said aperture means and said conduit means, respectively, a cover member covering said case member, means extending between said cover member and said retainer stud for securing said cover member in place, said lip residing within said annular guideway whereby said case and base members are attached to each other and may be moved angularly relative to each other and may also be moved laterally with respect to each other.

3. A junction box assembly comprising in combination a base member having means for mounting the same upon a supporting structure and a case member having wall means defining an enclosure for housing the electrically joined end portions of conductors, said base member including a mounting plate, said mounting plate having first and second sides, said mounting plate including a raised central portion with an outer portion of said mounting plate extending around said raised central portion, said raised central portion and said outer portion of said base member meeting to form an annular shoulder, aperture means extending through said raised central portion from said first to said second side thereof for the reception of electrical conductors, an annular case retainer, means fixedly securing said case retainer to said first side of said mounting plate, said case retainer having an outer peripheral edge portion spaced from said outer portion of said mounting plate, said outer peripheral edge portion of said case retainer and said outer portion of said mounting plate forming an annular guideway therebetween, a retainer stud attached to said raised central portion and extending from said first side thereof, said case member having a lip which resides in said guideway, said lip terminating in a lip wall which is annular in configuration, said annular lip wall being larger than said annular shoulder and permitting lateral shifting of said case member and said base member relative to each other, conduit means for introducing electrical conductors into said case member, a cover member covering said case member, and means extending between said cover member and said retainer stud for securing said cover member in place and preventing lateral shifting of said case member relative to said base member.

4. A junction box assembly comprising in combination a base member having means for mounting the same upon a supporting structure and a case member having wall means defining an enclosure for housing the electrically joined end portions of conductors, one of said members including a mounting plate, said mounting plate having first and second sides, said mounting plate including an offset central portion with an outer portion of said mounting plate extending around said offset central portion, said offset central portion and said outer portion of said one of said members meeting to form an annular shoulder, aperture means extending through said offset central portion from said first to said second side thereof for the reception of electrical conductors, a case retainer having slot means in the central portion thereof and located on said first side of said mounting plate with said slot means in register with said aperture means, means fixedly securing said case retainer to said first side of said mounting plate, said case retainer having an outer peripheral edge portion spaced from said outer portion of said mounting plate, said outer peripheral edge portion of said case retainer and said outer portion of said mounting plate forming an annular guideway therebetween, the other of said members having a lip which resides in said guideway, said lip terminating in a lip wall which is annular in configuration, said annular lip wall being larger than said annular shoulder and permitting lateral shifting of said case and base members relative to each other, conduit means for introducing electrical conductors into said case member, and means for preventing lateral shifting of said case and base members relative to each other.

References Cited in the file of this patent

UNITED STATES PATENTS

| | | |
|---|---|---|
| 1,135,699 | Knauber | Apr. 13, 1915 |
| 1,723,866 | Knoderer | Aug. 6, 1929 |
| 2,715,152 | Balzer | Aug. 9, 1955 |